US011822948B2

United States Patent
Tsirkin (10) Patent No.: US 11,822,948 B2
(45) Date of Patent: Nov. 21, 2023

(54) PERIPHERAL COMPONENT INTERCONNECT (PCI) DEVICE REMOVAL FOR VIRTUAL MACHINES

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 407 days.

(21) Appl. No.: 16/712,146

(22) Filed: Dec. 12, 2019

(65) Prior Publication Data
US 2021/0182092 A1 Jun. 17, 2021

(51) Int. Cl.
G06F 9/455 (2018.01)
G06F 13/40 (2006.01)
G06F 13/10 (2006.01)

(52) U.S. Cl.
CPC ........ *G06F 9/45558* (2013.01); *G06F 13/105* (2013.01); *G06F 13/4022* (2013.01); *G06F 13/4072* (2013.01); *G06F 2009/45562* (2013.01); *G06F 2009/45579* (2013.01)

(58) Field of Classification Search
None
See application file for complete search history.

(56) References Cited

U.S. PATENT DOCUMENTS

2010/0021171 A1 1/2010 Wang et al.
2017/0046187 A1* 2/2017 Tsirkin ................ G06F 9/45558
2017/0054593 A1* 2/2017 Borikar ............... H04L 41/0816
2018/0027602 A1 1/2018 Yi et al.
2018/0276024 A1* 9/2018 He ...................... G06F 9/45508

FOREIGN PATENT DOCUMENTS

CN 102473157 B 12/2015
CN 108701109 A 10/2018

OTHER PUBLICATIONS

Intel Corporation, "Virtual Hot Inserting Functions in a Shared I/O Environment", located at https://www.intel.com/content/dam/www/public/us/en/documents/white-papers/333596-hot-plug-capability-nvme-ssds-paper.pdf, Date 2016, pp. 1-2.
(Continued)

*Primary Examiner* — Lewis A Bullock, Jr.
*Assistant Examiner* — Melissa A Headly
(74) *Attorney, Agent, or Firm* — Womble Bond Dickinson (US) LLP (57) ABSTRACT

In response to a request to remove a PCI device from a virtual machine (VM), a processing device may transmit, to a guest operating system (OS) of a VM, an indication that a peripheral component interconnect (PCI) device connected to the VM has been disconnected such that the PCI device appears disconnected to a PCI port driver of the guest OS and simultaneously communicates with a device driver of the guest OS. The processing device may transmit a device removal request to the device driver. The removal request may be transmitted to the device driver without the delay associated with the "push button" approach to device removal since the guest OS already believes the PCI device has been disconnected from the VM. A graceful removal of the device driver may be performed and the PCI device may be disconnected from the VM.

14 Claims, 7 Drawing Sheets

(56) References Cited

OTHER PUBLICATIONS

Philippe Legros, "Why using SingleRoot I/O Virtualization (SR-IOV) can help improve I/O performance and Reduce Cost", located at https://www.design-reuse.com/articles/32998/single-root-i-o-virtualization.html, Date Mar. 11, 2019, pp. 1-4.

"Fast Partial Reconfiguration Over PCI Express", Located at https://www.xilinx.com/support/documentation/application_notes/xapp1338-fast-partial-reconfiguration-pci-express.pdf, Date Mar. 11, 2019, pp. 1-15.

* cited by examiner

PERIPHERAL COMPONENT INTERCONNECT (PCI) DEVICE REMOVAL FOR VIRTUAL MACHINES

TECHNICAL FIELD

Aspects of the present disclosure relate to virtual machines (VMs), and more particularly, to attaching and removing peripheral component interconnect (PCI) devices to VMs.

BACKGROUND

Hypervisors abstract the physical resources of a computing device such as physical processing devices (e.g., processors, CPUs, etc.) and physical memory (e.g., RAM) into virtual resources which can be utilized to deploy multiple VMs. The hypervisor may manage and assign these virtual resources to each VM running on the computing device. A PCI bus is a local computer bus for attaching hardware devices (referred to as "PCI devices") to a computing device (e.g., a personal computer). A PCI device may also be exposed to a VM running on a host computing device, so that the VM may utilize the functionality provided by the PCI device. There are a number of ways that a PCI device may be presented to a VM using the hypervisor. For example, a hypervisor of the host computing device may facilitate communication between the PCI device and the VM by presenting an emulation of the PCI device to the VM.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The number of PCI devices that a host computing device may handle at one time is limited. Thus, whenever a VM wants to change configuration (e.g., add or remove a PCI device to the virtual PCI bus of the VM), a virtualization management service may often need to add or remove PCI devices to/from a VM without requiring the VM to reboot. This process of adding or removing PCI devices to a VM without rebooting may be referred to as hot adding and hot removing respectively. However, with the speed and frequency at which a VM may hot add/remove PCI devices, particularly PCI express (PCIe) devices, the VM may not be able to unload the device drivers corresponding to such PCI devices before removing the PCI devices.

Current hypervisors may emulate device removal buttons, which may be "pressed" to begin a device ejection process. For example, a single press may request removal of the PCI device, while two presses may cancel the removal request. Because such removal buttons are designed to mimic a physical button, the hypervisor may have long timeouts hard coded which allow a user to react. For example, the Linux operating system may wait five seconds after a button press before first removing a device driver of the PCI device and then removing the PCI device itself. However, such long timeouts result in management of multiple PCI devices connected to a VM being very difficult in light of the speed and frequency at which the VM may hot add/remove PCI devices. If a PCI device is surprise removed (e.g., abruptly pulled out) before a device driver is removed, the device driver may crash, as many device drivers crash when faced with missing hardware.

The present disclosure addresses the above-noted and other deficiencies by using a processing device to transmit, to a guest operating system (OS) of a virtual machine (VM), an indication that a peripheral component interconnect (PCI) device connected to the VM has been disconnected such that the PCI device appears disconnected to a PCI port driver of the guest OS and, in one embodiment, simultaneously communicates with a device driver of the guest OS. In this way, while the PCI port driver (and as a result, the guest OS) may assume that the PCI device has been removed, the device driver may not crash as it may still communicate with the PCI device. Because the guest OS assumes the PCI device has been disconnected from the VM, it may wish for the device driver to release resources allocated to the PCI device and may transmit a device removal request to the device driver in response to receiving the indication. The removal request may be transmitted to the device driver without the delay associated with the "push button" approach to device removal since the guest OS already believes the PCI device has been disconnected from the VM. A graceful removal of the device driver may be performed and the PCI device may be safely disconnected from the VM.

Figure 1:
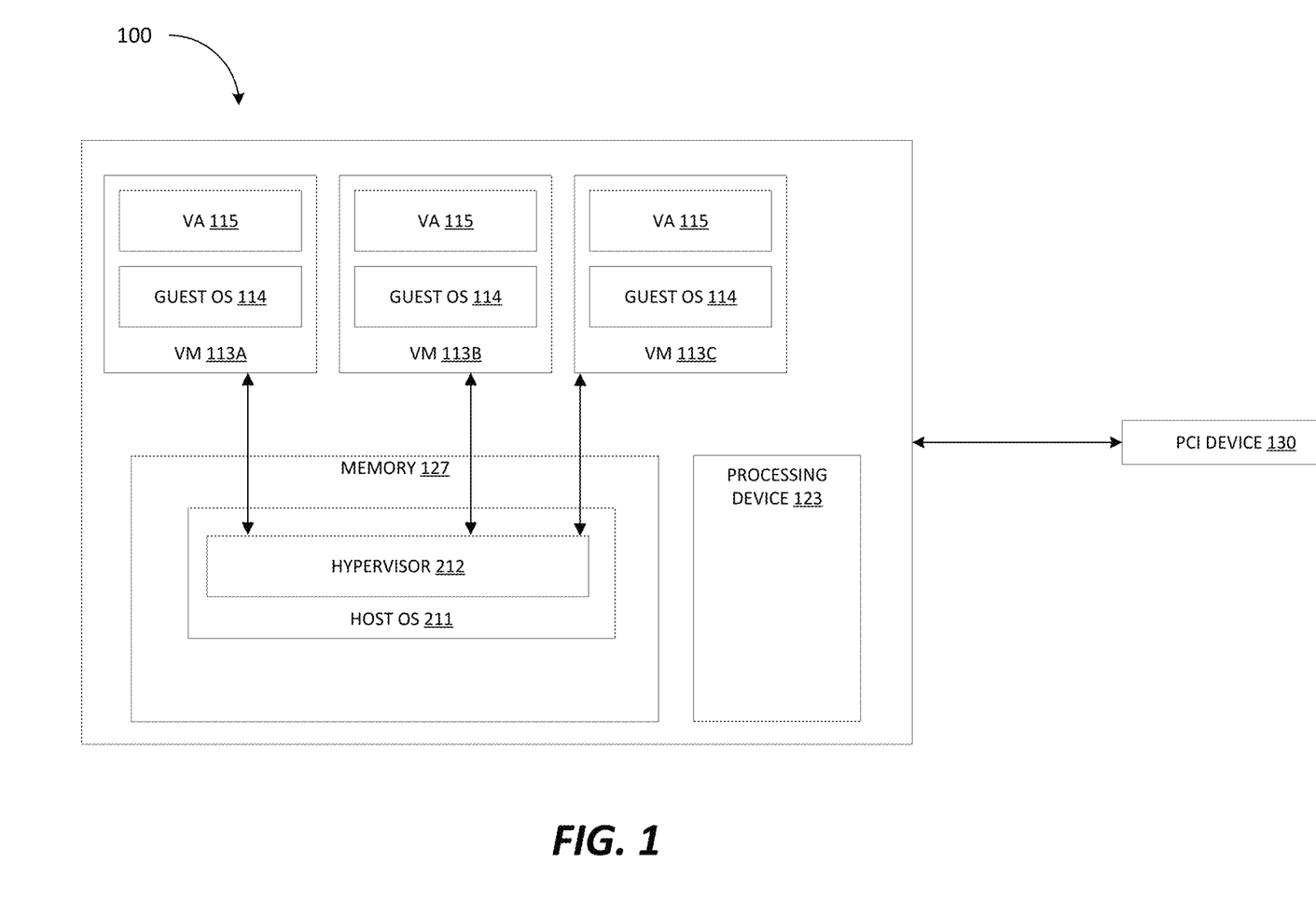
FIG. 1 is a block diagram that illustrates an example computing device coupled to a PCI device, in accordance with some embodiments of the present disclosure.

FIG. 1 is a block diagram that illustrates an example computing device 100. Computing device 100 may include hardware such as processing device 123 (e.g., processors, central processing units (CPUs)), memory 127 (e.g., random access memory (RAM), storage devices (e.g., hard-disk drive (HDD), solid-state drive (SSD), etc.), and other hardware devices (e.g., sound card, video card, etc.). In some embodiments, memory 127 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 100. The computing device 100 may comprise any suitable type of computing device or machine that has a programmable processor including, for example, server computers, desktop computers, laptop computers, tablet computers, smartphones, set-top boxes, etc. In some examples, the computing device 100 may comprise a single machine or may include multiple interconnected machines (e.g., multiple servers configured in a cluster). Memory 127 may include host operating system (OS) 211, which may manage the execution of other components (e.g., software, applications, etc.) and/or may manage access to the hardware (e.g., processors, memory, storage devices etc.) of the computing device 100.

The host OS 211 may include a hypervisor 12, which may also be known as a virtual machine monitor (VMM). In the example shown, hypervisor 212 may be a component of the host operating system 211. In another example, hypervisor 212 may run on top of host open system 211, or may run directly on host hardware without the use of a host operating system 211. Hypervisor 212 may manage system resources, including access to processing device 123, memory 127, other storage devices (e.g., HDDs, SSDs), and/or other devices (e.g., sound cards, video cards, etc.). The hypervisor 212, though typically implemented in software, may emulate and export a bare machine interface to higher level software in the form of virtual processors and guest memory (virtual resources). Higher level software may comprise a standard or real-time operating system (OS), may be a highly stripped down operating environment with limited operating system functionality, and/or may not include traditional OS facilities, etc. For example, higher level software may be a network virtualization platform (not shown) such as the RedHat™ OpenStack™ virtualization platform. Hypervisor 212 may present other software (i.e., "guest" software) the abstraction of one or more virtual machines (VMs) that provide the same or different abstractions to various guest software (e.g., guest operating system, guest applications).

In some embodiments, a network virtualization platform (also referred to as a "virtualization management service") may also execute on the host OS 211. The network virtualization platform may use a consistent set of application programming interfaces (APIs) to abstract those virtual resources provided by the hypervisor 212 one step further into discrete pools that may be used to configure and deploy VMs (e.g., VMs 113) and virtual applications (e.g., VAs 115) that administrators and users may interact with directly. The network virtualization platform may include a deployment controller to handle creation of VMs 113 as well as provisioning of the VMs 113 with virtual applications 115. The deployment controller may also function to manage the operations of the virtual applications. For example, the network virtualization platform may utilize the deployment controller to create virtual switches (and a VM 113 for the switch to run on) as well as manage the operations of the virtual switch (e.g., configuring/modifying rules and groups, managing connections with other virtual network functions (VNFs) and handling diagnostic tasks). The VMs 113 may be isolated, in that they are not connected to any other device or component of computing device 100, whether virtual or otherwise.

VMs 113A-113C may execute on computing device 100 as described herein. In one embodiment, a VM 113 may be a software implementation of a machine (e.g., a software implementation of a computing device) that includes its own operating system (i.e. guest OS 214) and executes one or more virtual applications (VA) 115. A VA 115 may be an application program, application, or software such as a virtual network function. The hypervisor 212 may emulate the hardware (and other physical resources) to provide virtual resources which may be used by the VMs 113 to execute guest software/applications (e.g., VAs 115), as discussed in more detail herein. A VM 113 may be, for example, a hardware emulation, a full virtualization, a para-virtualization, and an operating system-level virtualization VM.

A VM 113 may execute a VA 115 (i.e. guest software) which may use an underlying emulation of the physical resources virtual processors and guest memory—virtual resources). Both the VM 113 and the VA 115 may be configured and deployed by a network virtualization platform executing atop the host OS 211, as discussed above. The network virtualization platform, via the computing device 100, may provide administrators and users with the capability to virtualize a variety of functions (e.g., network functions).

Although one VA 115 is illustrated in a respective VM 113, a VM 113 may include multiple VAs 115 in other embodiments. In some embodiments, VAs 115 may be deployed and managed by a deployment controller (not illustrated in the figures) executing as part of a network virtualization platform.

FIG. 1 also illustrates PCI device 130, which may be coupled (e.g., operatively) to computing device 100. PCI device 130 may be coupled to computing device 100 via a PCI bus of computing device 100. PCI device 130 may comprise any computing hardware that may connect to the PCI bus of a computing device (e.g., computing device 100) to perform a particular function(s) such as a network card, modem, or sound card, for example. Although illustrated as connected to computing device 100 (e.g., the host machine for VM 113) in FIG. 1, PCI device 130 may also be directly connected to and utilized by a VM 113 as discussed in further detail herein.

When connecting to a VM 113, there are a number of ways that PCI device 130 may be presented to the VM 113. For example, PCI device 130 may present to the VM 113 as an emulation device, a para-virtualized device, or an assigned device. Emulated devices may be purely virtual devices that mimic real hardware, and allow a guest OS 114 to work with them using standard in-box drivers. Devices may be emulated within the hypervisor 212 or within user space (e.g., a VM 113). For example, hypervisor 212 may include emulations of common devices that a guest OS 114 can share, including virtual disks, virtual network adapters, and other necessary platform elements. Para-virtualized devices may be purely virtual devices designed to work optimally in a VM. Para-virtualized devices may be similar to emulated devices, but may require specialized drivers.

Assigned devices may be physical PCI devices that are directly connected to a VM 113. This method is also known as passthrough. Device assignment allows a VM 113 to have exclusive access to PCI devices for a range of tasks, and allows PCI devices to appear and behave as if they were physically attached to the guest OS 114 of the VM 113. The drivers of the guest OS 114 may use the PCI device hardware directly without relying on any driver capabilities from the host OS 211.

Figure 2A:
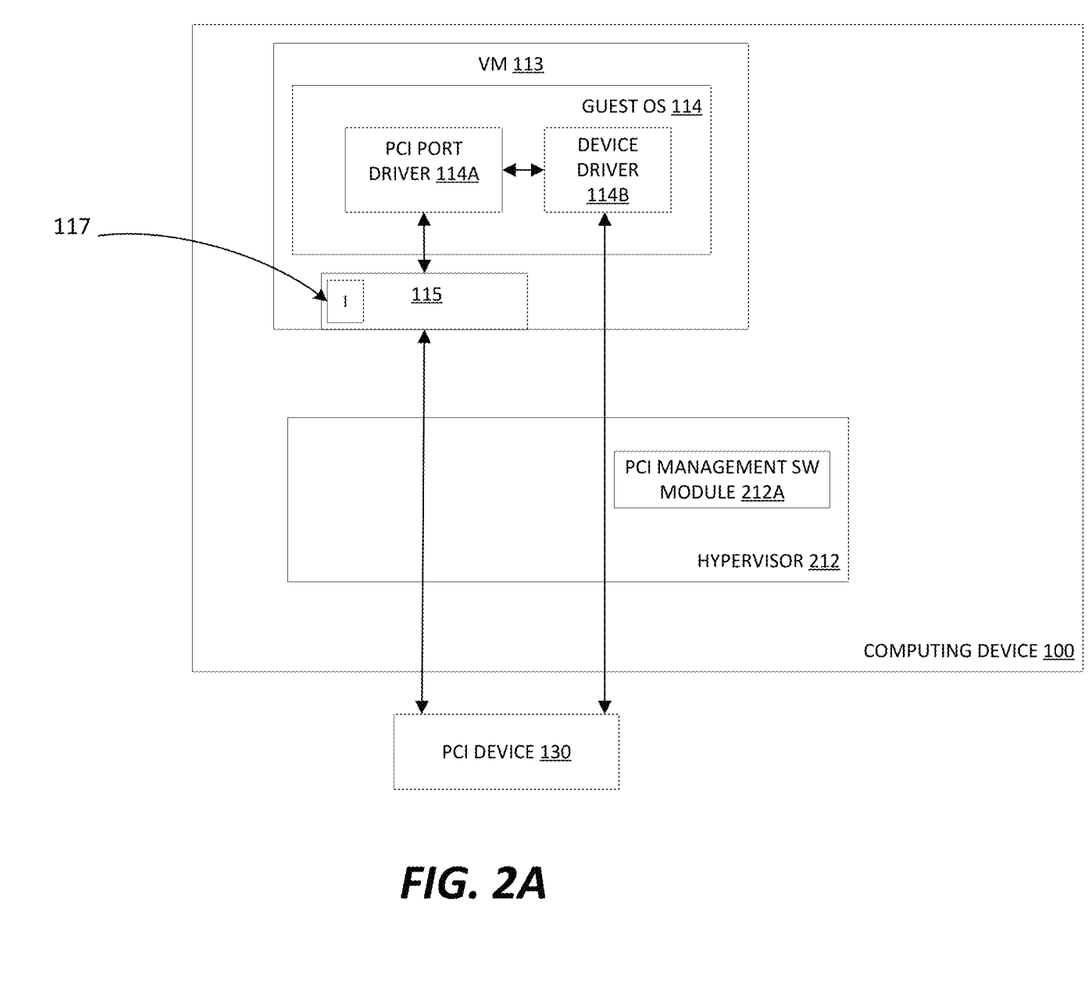
FIG. 2A is a block diagram that illustrates an example coupling of a PCI device to a VM, in accordance with some embodiments of the present disclosure.
Figure 3:
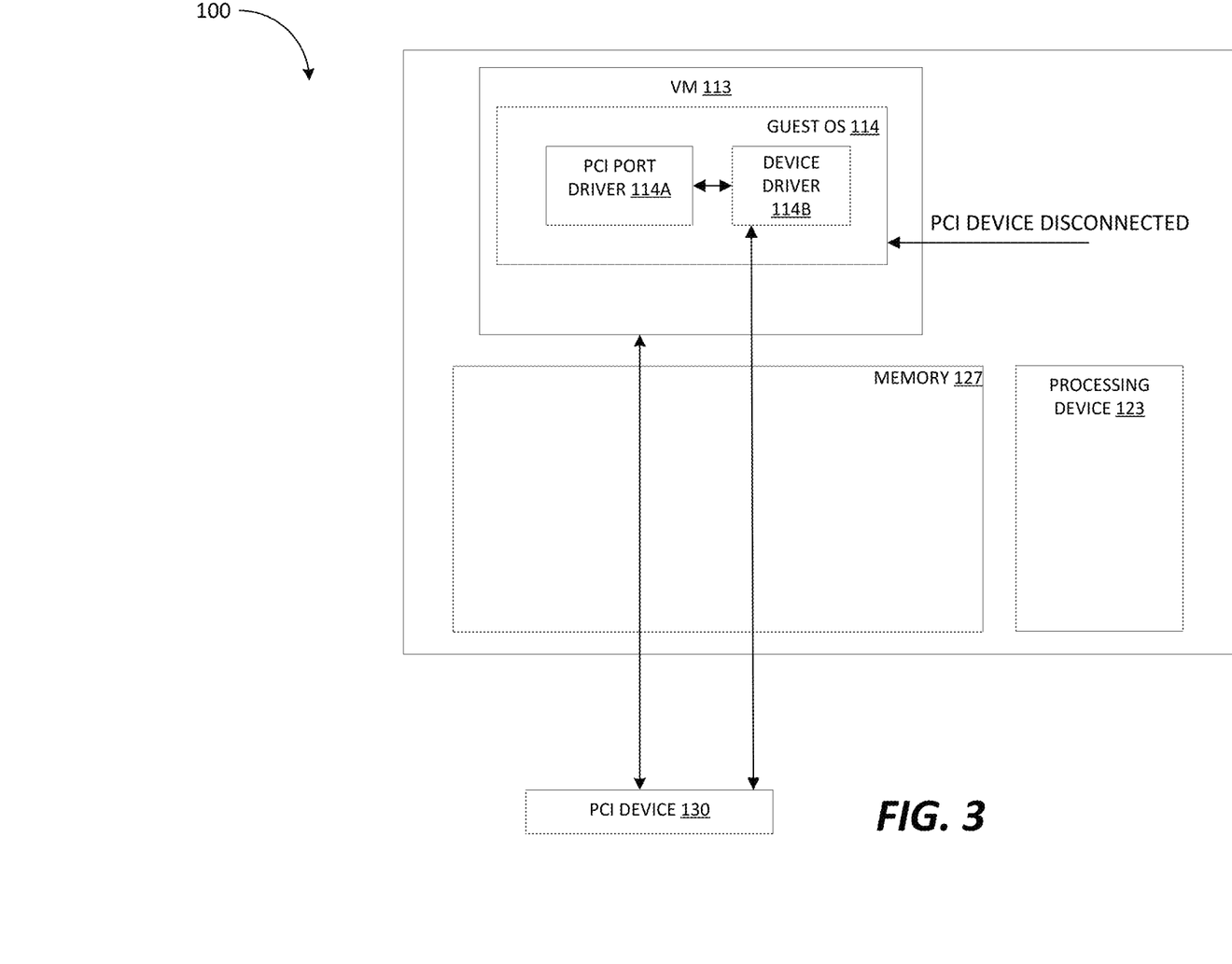
FIG. 3 is a block diagram that illustrates an example coupling of a PCI device to a VM, in accordance with some embodiments of the present disclosure.

FIGS. 2A and 3 illustrate the PCI device 130 of FIG. 1 coupled to a VM 113 executing on computing device 100. PCI device 130 is connected to the VM 113 as an assigned device (e.g., using device passthrough) in the example of FIGS. 2 and 3 for purposes of describing exemplary embodiments, however the embodiments described herein may be implemented when the PCI device 130 presents to the VM 113 as an emulated device or a para-virtualized device as well. FIGS. 2A and 3 also illustrate computing device 100 with a single VM 113 for ease of illustration and description only, and any appropriate number of VMs may run on computing device 100. Referring to FIGS. 2A and 3, VM 113 may include virtual PCI bus 115, which may be used to attach PCI device 130 to the VM 113. The virtual PCI bus 115 may have a number of PCI slots (not shown in the FIGs) which may allow multiple PCI devices to connect to the VM 113. The virtual PCI bus 115 may be virtual hardware that is emulated by the hypervisor 212. In some embodiments, virtual PCI bus 115 may be a PCI express (PCIe) bus, which may support a single PCI device connection. The guest OS 114 may include a device driver 114B and a PCI port driver 114A. PCI port driver 114A may function to communicate with the virtual PCI bus 115 on behalf of the guest OS 114 so as to manage the presence of each PCI device that is connected to the VM 113. For example, the virtual PCI bus 115 may include a presence register 117 which may indicate whether PCI device 130 is still connected to virtual PCI bus 115 or not as discussed in further detail below.

Device driver 114B may communicate directly with PCI device 130 without assistance from PCI port driver 114A and guest OS 114. Although illustrated as having a single device driver 114B, guest OS 114 may include any appropriate number of device drivers and each device driver may communicate directly with a PCI device connected to the VM 113, as discussed herein. Thus, PCI device 130 may connect to VM 113 through virtual PCI bus 115 and hypervisor 212, but may communicate directly with device driver 114B when the VM 113 is utilizing the PCI device 130. This modularity of the guest OS 114 may enable embodiments of the present disclosure, as discussed in further detail herein.

Figure 2B:
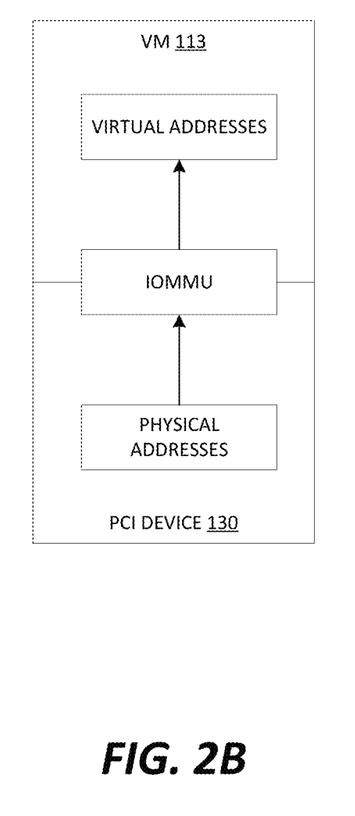
FIG. 2B is a block diagram that illustrates an example mapping of PCI device physical addresses to virtual addresses of a VM, in accordance with some embodiments of the present disclosure.

Hypervisor 212 may function to allow communication between the PCI device 130 and the guest OS 114 (e.g., the drivers thereof). More specifically, hypervisor 212 may map PCI physical addresses to guest virtual addresses and provide direct memory access (DMA) address translation and permissions checking for efficient device passthrough. In one example, the hypervisor 212 may map the PCI device 130 physical addresses to the virtual addresses of VM 113 in a page table of the processing device 123. In another example, the memory of the VM 113 may be made available to the PCI device 130 in a page table of an input/output memory management unit (IOMMU) (not shown) by the hypervisor 212. In this way, device driver 114B may communicate with the PCI device 130 independently of the PCI port driver 114A. FIG. 2B illustrates an example of the mapping of PCI device 130 physical addresses to the virtual addresses of VM 113 using an IOMMU. Referring back to FIGS. 2A and 3, Hypervisor 212 may also provide remapping of interrupts for the PCI device 130 and PCI device configuration emulation, for example. Hypervisor 212 may include PCI management software component 212A (hereinafter "module 212A"), which may be executed to enable hypervisor 212 to perform one or more of the functions described herein with respect to FIGS. 2A and 3. When hypervisor 212 receives (e.g., from a virtualization management service of the hypervisor 212 such as Red Hat™ OpenStack™ virtualization platform, for example) a request to disconnect PCI device 130 from VM 113, it may put the PCI device 130 into a presence-only removal state, wherein the PCI device 130 may communicate with device driver 114B of the guest OS 114 while also appearing disconnected to PCI port driver 114A and the guest OS 114. To do this, hypervisor 212 may transmit to the guest OS 114, an indication that the PCI device 130 has been removed (even though it is still connected). More specifically, hypervisor 112 may update the presence register 117 in the virtual PCI bus 115 from a high state (e.g., a value of "1" in the register 117) to a low state (e.g., a value of "0" in the register 117) to indicate that the PCI device 130 has been removed and send an interrupt to the guest OS 114 indicating that the presence state of the PCI device 130 has changed. In response to the interrupt, the guest OS 114 (through the PCI port driver 114A) may communicate with the virtual PCI bus 115 regarding the connection status of PCI device 130 and assume that the PCI device 130 is no longer present as the presence register 117 of the virtual PCI bus 115 indicates that the PCI device 130 is no longer present. At this point, if guest OS 114 attempts to communicate with PCI device 130, it will not see the PCI device 130. However, device driver 114B may still be able to communicate with PCI device 130, thus preventing device driver 114B from crashing. For example, the memory of PCI device 130 may remain mapped in the page table of the processing device 123, and thus device driver 114B may continue to access the memory of PCI device 130. In another example, the memory of VM 113 may remain mapped in the page table of the IOMMU, and thus the PCI device 130 may cot access the memory of the VM 113. Further, the PCI device 130 interrupts may remain mapped to the VM 113 in an interrupt redirection table, resulting in the PCI device 130 being able to send interrupts to the VM 113, for example.

As a result, the guest OS 114 may assume that the PCI device 130 is no longer connected to the VM 113, and may wish for the device driver 114B to stop communicating with the device 130 and to free up resources (e.g., memory, I/O bandwidth) that the driver 114B has allocated to the PCI device 130. Thus, the guest OS (e.g., via the PCI port driver 114A) may transmit a device removal request to the device driver 114B. Guest OS 114 may wish for the device driver 114B to free up resources that it has allocated to the PCI device 130 regardless of whether the PCI device 130 is actually not there (e.g., due to being surprise removed), or there has been a request to remove the device 130. Thus, guest OS 114 may utilize a common device removal request for both scenarios. Because the guest OS 114 already assumes the PCI device 130 is not present, it may transmit the device removal request to the device driver 114B upon receiving the indication that the PCI device 130 is no longer present, and without the delay traditionally associated with the "push button" approach to removing the PCI device 130. Upon receiving the device removal request, device driver 114B may probe the PCI device 130 to determine whether it is still connected to the VM 113 or not. In response to determining that PCI device 130 is still connected, device driver 114B may gracefully remove itself by performing one or more graceful removal operations. Graceful removal operations may include resetting the PCI device 130, disabling the PCI device 130, waiting for interrupt handlers of the PCI device 130 to finish executing, disabling memory allocated to the PCI device 130, and flushing any access requests from the guest OS 114 to the PCI device 130 or from the PCI device 130 to memory of the guest OS 114. Upon completing one or more graceful removal operations, device driver 114B may then remove itself and inform the PCI port driver 114A that it has been removed. In some embodiments, in response to receiving the indication that the device driver 114B has been removed, the hypervisor 212 may remove the PCI device 130. In other embodiments, in response to detecting completion of one or more of the graceful removal operations performed by device driver 114B, the hypervisor 212 may remove the PCI device 130.

More specifically, hypervisor may unmap the PCI device 130 from the VM 113 and notify a virtualization management service (e.g., Red Hat™ OpenStack™ virtualization platform). Unmapping the PCI device 130 from the VM 113 may include unmapping the PCI device 130 physical addresses from the virtual addresses of VM 113 (e.g., from a page table of the processing device 123 or the IOMMU as discussed above).

In other embodiments, upon completing one or more graceful removal operations, device driver 114B may inform the PCI port driver 114A that it has been removed, and in response the PCI port driver 114A may remove power from the virtual PCI bus 115. For example, if the virtual PCI bus 115 is a virtual PCIe bus, then only a single device (e.g., PCI device 130) may be present on the bus, and thus removing power from the virtual PCI bus 115 will not affect other devices. In response to detecting that virtual PCI bus 115 has been powered down, hypervisor 212 may disconnect the PCI device 130 from the VM 113. More specifically, hypervisor 212 may unsnap the PCI device 130 from the VM 113 and notify a virtualization management service (e.g., Red Hat™ OpenStack™ virtualization platform). In other embodiments, in response to being informed that the device driver 114B has been removed, PCI port driver 114A may remove power from the PCI device 130 itself. For example, if the virtual PCI bus 115 is not a virtual PCIe bus, then it may not be powered down because other devices may be present on the virtual PCI bus 115. Thus, PCI port driver 114A may remove power from the PCI device 130 instead. In response to detecting that the PCI device 130 has been powered down, hypervisor 212 may disconnect the PCI device 130 from the VM 113. More specifically, hypervisor 212 may unmap the PCI device 130 from the VM 113 and notify a virtualization management service (e.g., Red Hat™ OpenStack™ virtualization platform).

Figure 4:
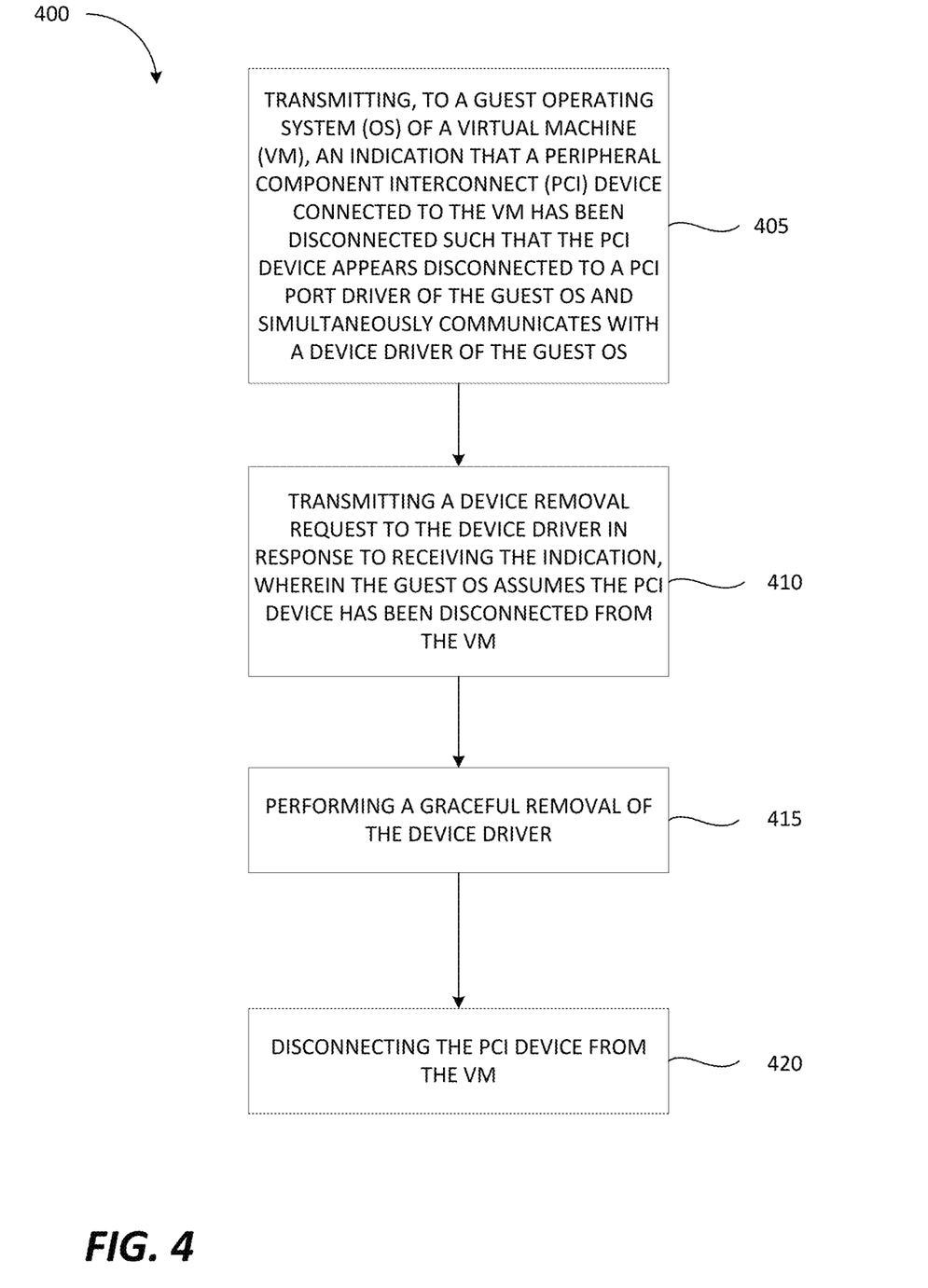
FIG. 4 is a flow diagram of a method for removing a PCI device from a VM, in accordance with some embodiments of the present disclosure.

FIG. 4 is a flow diagram of a method 400 of removing a PCI device from a VM, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software instructions running/executing on a processing device), firmware (e.g., microcode), or a combination thereof. In some embodiments, the method 400 may be performed by a computing device (e.g., computing device 100 illustrated in FIG. 1). For example, method 400 may be performed by processing device 123 executing P1 management SW module 212A.

With reference to FIG. 2A as well, the method 400 begins at block 405, where hypervisor 212 may transmit to the guest OS 114, an indication that the PCI device 130 has been removed (even though it is still connected), thereby putting the PCI device 130 into a presence-only removal state, wherein the PCI device 130 may communicate with device driver 114B of the guest OS 114 while also appearing disconnected to PCI port driver 114A and the guest OS 114. The guest OS 114 (through the PCI port driver 114A) may communicate with the virtual PCI bus 115 regarding the connection status of PCI device 130 and assume that the PCI device 130 is no longer present. At this point, if guest OS 114 attempts to communicate with PCI device 130, it will not see the PCI device 130. However, device driver 114B may still be able to communicate with PCI device 130, thus preventing device driver 114B from crashing.

At block 410, the PCI port driver 114A may transmit a device removal request to the device driver 114B. Because the guest OS 114 may assume that the PCI device 130 is no longer connected to the VM 113, it may wish for the device driver 114B to stop communicating with the device 130 and to free up resources (e.g., memory, I/O bandwidth) that the driver 114B has allocated to the PCI device 130. Guest OS 114 may wish for the device driver 114B to free up resources that it has allocated to the PCI device 130 regardless of whether the device 130 is actually not there (e.g., due to being surprise removed), or there has been a request to remove the device 130. Thus, guest OS 114 may utilize a common device removal request for both scenarios. Because the guest OS 114 already assumes the PCI device 130 is not present, it may (e.g., via the PCI port driver 114A) transmit the removal request to the device driver 114B immediately upon receiving the indication that the PCI device 130 is no longer present, and without the delay traditionally associated with the "push button" approach to removing the PCI device 130. Upon receiving the removal request, device driver 114B may probe the PCI device 130 to determine whether it is still connected to the VM 113 or not.

At block 415, in response to determining that PCI device 130 is still connected, device driver 114B may gracefully remove itself by performing one or more graceful removal operations. Graceful removal operations may include resetting the PCI device 130, disabling the PCI device 130, waiting for interrupt handlers of the PCI device 130 to finish executing, disabling memory and/or other resources allocated to the PCI device 130, and flushing any access requests from the guest OS 114 to the PCI device 130 or from the PCI device 130 to memory of the guest OS 114. Upon completing one or more graceful removal operations, device driver 114B may then remove itself and inform the PCI port driver 114A that it has been removed.

At block 420, in some embodiments, in response to receiving the indication that the device driver 114B has been removed, the hypervisor 212 may remove the PCI device 130. In other embodiments, in response to detecting completion of one or more of the graceful removal operations performed by device driver 114B, the hypervisor 212 may remove the PCI device 130. More specifically, hypervisor 212 may unmap the PCI device 130 from the VM 113 and notify a virtualization management service (e.g., Red Hat™ OpenStack™ virtualization platform). Unmapping the PCI device 130 from the VM 113 may include unmapping the PCI device 130) physical addresses from the virtual addresses of VM 113 (e.g., from a page table of the processing device 123 or the IOMMU as discussed above).

In other embodiments, upon completing one or more graceful removal operations, device driver 114B may inform the PCI port driver 114A that it has been removed, and in response the PCI port driver 114A may remove power from the virtual PCI bus 115. For example, if the virtual PCI bus 115 is a virtual PCIe bus, then only a single device (e.g., PCI device 130) may be present on the bus, and thus removing power from the virtual PCI bus 115 will not affect other devices. In response to detecting that virtual PCI bus 115 has been powered down, hypervisor 212 may disconnect the PCI device 130 from the VM 113. More specifically, hypervisor 212 may unmap the PCI device 130 from the VM 113 and notify a virtualization management service (e.g., Red Hat™ OpenStack™ virtualization platform). In other embodiments, in response to being informed that the device driver 114B has been removed, PCI port driver 114A may remove power from the PCI device 130 itself. For example, if the virtual PCI bus 115 is not a virtual PCIe bus, then it may not be powered down because other devices may be present on the virtual PCI bus 115. Thus, PCI port driver 114A may remove power from the PCI device 130 instead. In response to detecting that the PCI device 130 has been powered down, hypervisor 212 may disconnect the PCI device 130 from the VM 113. More specifically, hypervisor 212 may unmap the PCI device 130 from the VM 113 and notify a virtualization management service (e.g., Red Hat™ OpenStack™ virtualization platform).

Figure 5:
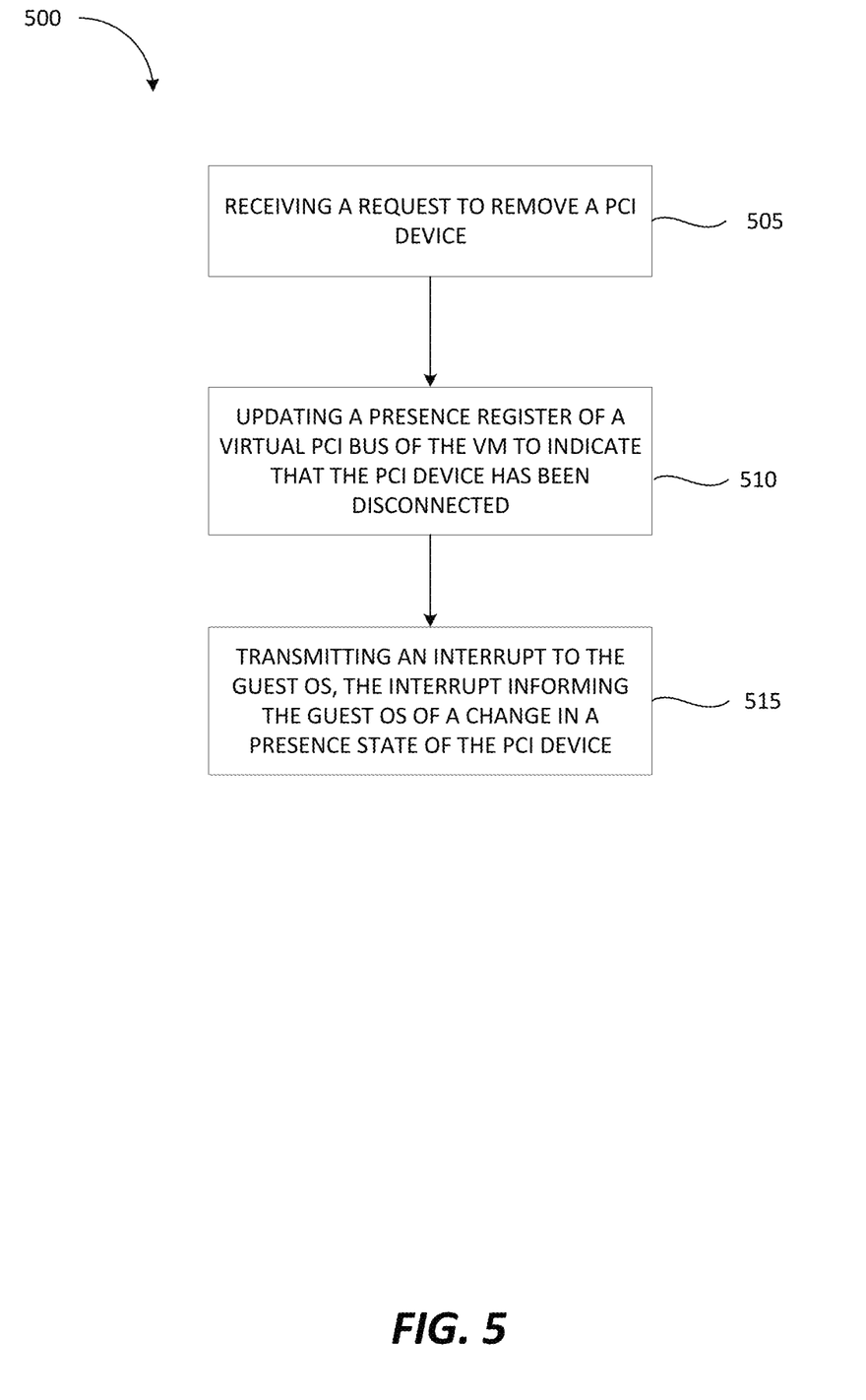
FIG. 5 is a flow diagram of a method for indicating that a PCI device is in a presence-only removal state, in accordance with some embodiments of the present disclosure.

FIG. 5 is a flow diagram of a method 500 of transmitting to the guest OS 114, an indication that the PCI device 130 has been removed, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 100 illustrated in FIG. 1). For example, method 500 may be performed by processing device 123 executing PI management SW module 212A.

With reference to FIG. 2A as well, at block 505, hypervisor 212 may receive (e.g., from a virtualization management service of the hypervisor such as Red Hat™ OpenStack™ virtualization platform, for example) a request to disconnect PCI device 130 from VM 113. At block 510, hypervisor 112 may update the presence register 117 in the virtual PCI bus 115 from a high state (e.g., a value of "1" in the register 117) to a low state (e.g., a value of "0" in the register 117) to indicate that the PCI device 130 has been removed. At block 515, hypervisor 212 may send an interrupt to the guest OS 114 indicating that the presence state of the PCI device 130 has changed.

Figure 6:
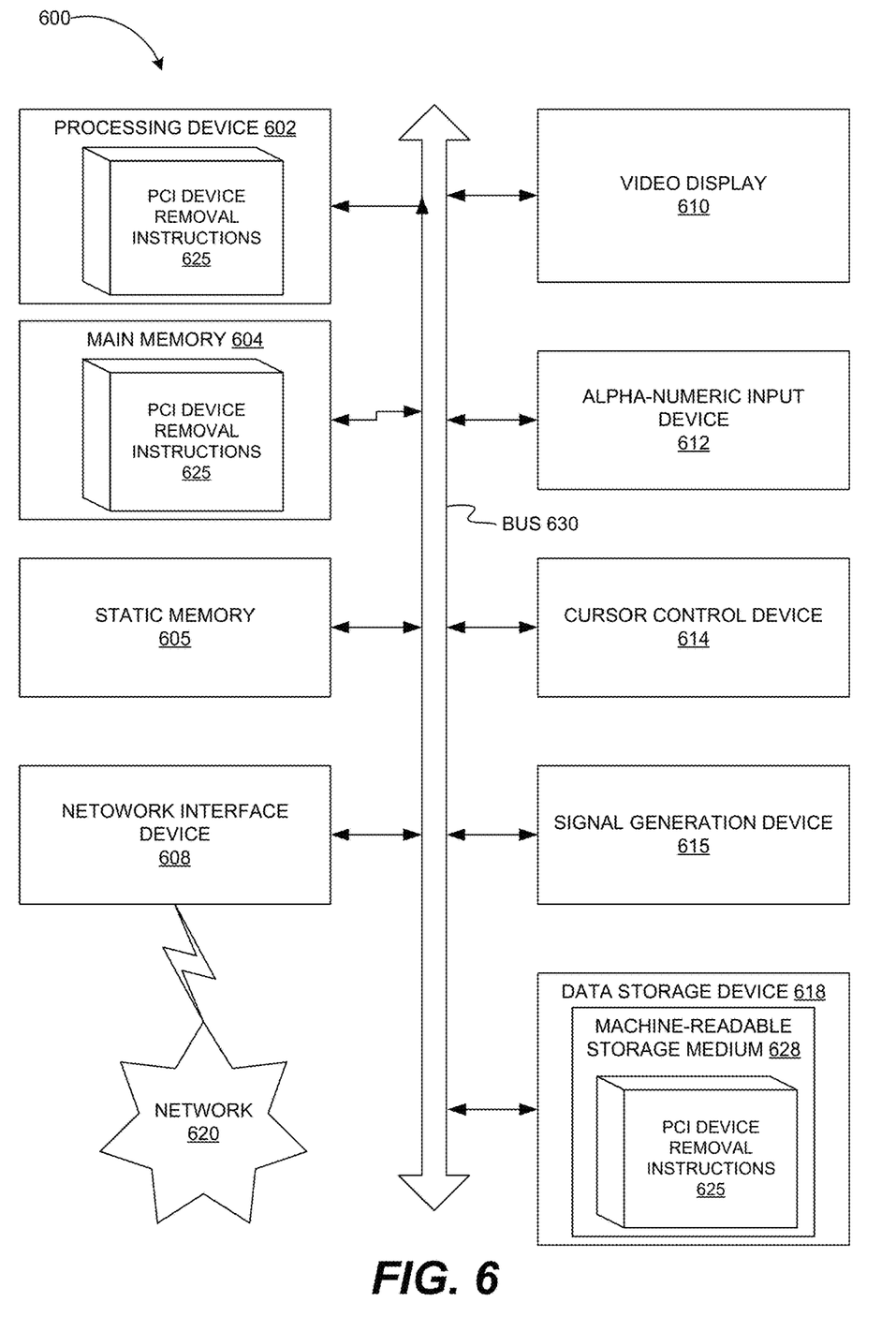
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. For example, computing device 600 may transmit, to a guest operating system (OS) of a virtual machine (VM), an indication that a peripheral component interconnect (PCI) device connected to the VM has been disconnected such that the PCI device appears disconnected to a PCI port driver of the guest OS and simultaneously communicates with a device driver of the guest OS. In this way, while the PCI port driver (and as a result, the guest OS) may assume that the PCI device has been removed, the device driver may not crash as it may still communicate with the PCI device. Because the guest OS assumes the PCI device has been disconnected from the VM, it may wish for the device driver to release resources allocated to the PCI device and thus computing device 600 may transmit a device removal request to the device driver. The removal request may be transmitted to the device driver without the delay associated with the "push button" approach to device removal since the guest OS already believes the PCI device has been disconnected from the VM. The computing device may perform a graceful removal of the device driver and disconnect the PCI device from the VM.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of PCI device removal instructions 625, e.g., instructions for carrying out the operations described herein, in accordance with one or more aspects of the present disclosure. PCI device removal 625 may also reside, completely or at least partially, within main memory 604 and/or within processing device 602 during execution thereof by computing device 600, main memory 604 and processing device 602 also constituting computer-readable media. The PCI device removal instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and restrictive, and the invention is not to be limited to the details given herein, but may be modified within the scope and equivalents of the appended claims.

What is claimed is:

1. A method comprising:
   transmitting, to a guest operating system (OS) of a virtual machine (VM), an indication that a peripheral component interconnect (PCI) device connected to the VM has been disconnected such that the PCI device appears disconnected to a PCI port driver of the guest OS while a device driver of the guest OS is in direct communication with the PCI device, wherein transmitting the indication comprises:
      updating a presence register of a virtual PCI bus of the VM to indicate that the PCI device has been disconnected; and
      transmitting an interrupt to the guest OS, the interrupt informing the guest OS of a change in a presence state of the PCI device;
   transmitting, by a processing device, a device removal request to the device driver in response to receiving the indication, wherein the guest OS assumes the PCI device has been disconnected from the VM;
   performing a removal of the device driver in response to the removal request;
   subsequent to the removal of the device driver, removing power from either the PCI device or a virtual PCI bus through which the PCI device is connected to the VM in accordance with a type of the virtual PCI bus; and disconnecting the PCI device from the VM in response to detecting the removal of power.

2. The method of claim 1, wherein performing the removal comprises performing one or more of: disabling the PCI device, resetting the PCI device, waiting for interrupt handlers of the PCI device to complete executing, disabling memory allocated to the PCI device, and flushing any access requests from the guest OS to the PCI device or from the PCI device to a memory of the guest OS.

3. The method of claim 1, wherein the device removal request is transmitted to the device driver from the guest OS to release resources allocated to the PCI device.

4. The method of claim 1, wherein physical addresses of the PCI device remain mapped to virtual addresses of the VM while the PCI device appears disconnected to the PCI port driver of the guest OS to facilitate communication between the PCI device and the device driver of the guest OS while the PCI device appears disconnected to the PCI port driver of the guest OS.

5. The method of claim 1, wherein disconnecting the PCI device from the VM comprises:
unmapping the PCI device from the VM; and
notifying a virtualization management service that the PCI device has been disconnected from the VM.

6. A system comprising:
a memory; and
a processing device, operatively coupled to the memory, the processing device to:
transmit, to a guest operating system (OS) of a virtual machine (VM), an indication that a peripheral component interconnect (PCI) device connected to the VM has been disconnected such that the PCI device appears disconnected to a PCI port driver of the guest OS while a device driver of the guest OS is in direct communication with the PCI device, wherein transmitting the indication comprises performing the steps of:
updating a presence register of a virtual PCI bus of the VM to indicate that the PCI device has been disconnected; and
transmitting an interrupt to the guest OS, the interrupt informing the guest OS of a change in a presence state of the PCI device;
transmit a device removal request to the device driver in response to receiving the indication, wherein the guest OS assumes the PCI device has been disconnected from the VM;
perform a removal of the device driver in response to the removal request;
subsequent to the removal of the device driver, remove power from either the PCI device or a virtual PCI bus through which the PCI device is connected to the VM in accordance with a type of the virtual PCI bus; and
disconnect the PCI device from the VM in response to detecting the removal of power.

7. The system of claim 6, wherein to perform the removal, the processing device is to perform one or more of: disabling the PCI device, resetting the PCI device, waiting for interrupt handlers of the PCI device to complete executing, disabling memory allocated to the PCI device, and flushing any access requests from the guest OS to the PCI device or from the PCI device to a memory of the guest OS.

8. The system of claim 6, wherein the processing device transmits the device removal request to the device driver to release resources allocated to the PCI device.

9. The system of claim 6, wherein physical addresses of the PCI device remain mapped to virtual addresses of the VM while the PCI device appears disconnected to the PCI port driver of the guest OS, to facilitate communication between the PCI device and the device driver of the guest OS while the PCI device appears disconnected to the PCI port driver of the guest OS.

10. The system of claim 6, wherein to disconnect the PCI device from the VM, the processing device is to:
unmap the PCI device from the VM; and
notify a virtualization management service that the PCI device has been disconnected from the VM.

11. A non-transitory computer-readable storage medium including instructions that, when executed by a processing device, cause the processing device to:
transmit, to a guest operating system (OS) of a virtual machine (VM), an indication that a peripheral component interconnect (PCI) device connected to the VM has been disconnected such that the PCI device appears disconnected to a PCI port driver of the guest OS while a device driver of the guest OS is in direct communication with the PCI device, wherein transmitting the indication comprises:
updating a presence register of a virtual PCI bus of the VM to indicate that the PCI device has been disconnected; and
transmitting an interrupt to the guest OS, the interrupt informing the guest OS of a change in a presence state of the PCI device;
transmit, by the processing device, a device removal request to the device driver in response to receiving the indication, wherein the guest OS assumes the PCI device has been disconnected from the VM;
perform a removal of the device driver in response to the removal request;
subsequent to the removal of the device driver, remove power from either the PCI device or a virtual PCI bus through which the PCI device is connected to the VM in accordance with a type of the virtual PCI bus; and
disconnect the PCI device from the VM in response to detecting the removal of power.

12. The non-transitory computer-readable storage medium of claim 11, wherein to perform the removal, the processing device is to perform one or more of: disabling the PCI device, resetting the PCI device, waiting for interrupt handlers of the PCI device to complete executing, disabling memory allocated to the PCI device, and flushing any access requests from the guest OS to the PCI device or from the PCI device to a memory of the guest OS.

13. The non-transitory computer-readable storage medium of claim 11, wherein the processing device transmits the device removal request to the device driver to release resources allocated to the PCI device.

14. The non-transitory computer-readable storage medium of claim 11, wherein to disconnect the PCI device from the VM, the processing device is to:
unmap the PCI device from the VM; and
notify a virtualization management service that the PCI device has been disconnected from the VM.

* * * * *